United States Patent [19]

Leonardi

[11] Patent Number: 4,937,728
[45] Date of Patent: Jun. 26, 1990

[54] SWITCH-MODE POWER SUPPLY WITH BURST MODE STANDBY OPERATION

[75] Inventor: Giovanni M. Leonardi, Giornico, Switzerland

[73] Assignee: RCA Licensing Corporation, Princeton, N.J.

[21] Appl. No.: 424,357

[22] Filed: Oct. 19, 1989

[30] Foreign Application Priority Data

Mar. 7, 1989 [GB] United Kingdom ............... 8905172
Mar. 7, 1989 [GB] United Kingdom ............... 8905173

[51] Int. Cl.$^5$ ........................................... H02M 3/335
[52] U.S. Cl. ................................. 363/97; 363/19; 363/49
[58] Field of Search .................. 363/18, 19, 20, 21, 363/49, 97, 131

[56] References Cited

U.S. PATENT DOCUMENTS

| | | | |
|---|---|---|---|
| 3,590,362 | 6/1971 | Kakalec | 321/18 |
| 3,818,314 | 6/1974 | Bishop et al. | 323/60 |
| 4,024,577 | 5/1977 | Djethelm | 358/190 |
| 4,135,233 | 1/1979 | Seiersen | 363/21 |
| 4,172,276 | 10/1979 | Kameya | 363/19 |
| 4,245,180 | 1/1981 | Rilly et al. | 358/190 |
| 4,327,404 | 4/1982 | Horiguchi | 363/19 |
| 4,595,977 | 6/1986 | Von der Ohe | 363/21 |
| 4,631,652 | 12/1986 | Wendt | 363/97 |
| 4,631,654 | 12/1986 | Houee et al. | 363/21 |
| 4,648,016 | 3/1987 | Peruth et al. | 363/21 |
| 4,683,528 | 7/1987 | Snow et al. | 363/21 |
| 4,688,159 | 8/1987 | Marinus | 363/19 |
| 4,692,852 | 9/1987 | Hoover | 363/131 |
| 4,692,853 | 9/1987 | Sartre et al. | 363/49 |
| 4,694,385 | 9/1987 | Marinus | 363/18 |
| 4,766,528 | 8/1988 | Marinus | 363/21 |
| 4,794,270 | 12/1988 | Park | 363/21 |

OTHER PUBLICATIONS

A schematic diagram of a power supply module AZB5000 of a television receiver power supply publ. by Siemens Co., Jan. 1974.
A data sheet dated Jan. 1986 for an integrated circuit, TEA2162, publ. by Thomson Semiconductors, France.

*Primary Examiner*—William H. Beha, Jr.
*Assistant Examiner*—Jeffrey Sterrett
*Attorney, Agent, or Firm*—Joseph S. Tripoli; Joseph J. Laks; Sammy S. Henig

[57] ABSTRACT

In a switch mode power supply, a first switching transistor is coupled to a primary winding of a transformer for generating pulses of a switching current. A secondary winding of the transformer is coupled via a switching diode to a capacitor of a control circuit for developing a control signal in the capacitor. The control signal is applied to a mains coupled chopper second transistor for generating and regulating supply voltages in accordance with pulse width modulation of the control signal. During standby operation, the first and second transistors operate in a burst mode that is repetitive at a frequency of the AC mains supply voltage such as 50 Hz. In the burst mode operation, during intervals in which pulses of the switching current occur, the pulse width and peak amplitude of the switching current pulses progressively increase in accordance with the waveform of the mains supply voltage to provide a soft start operation in the standby mode of operation within each burst group.

24 Claims, 6 Drawing Sheets

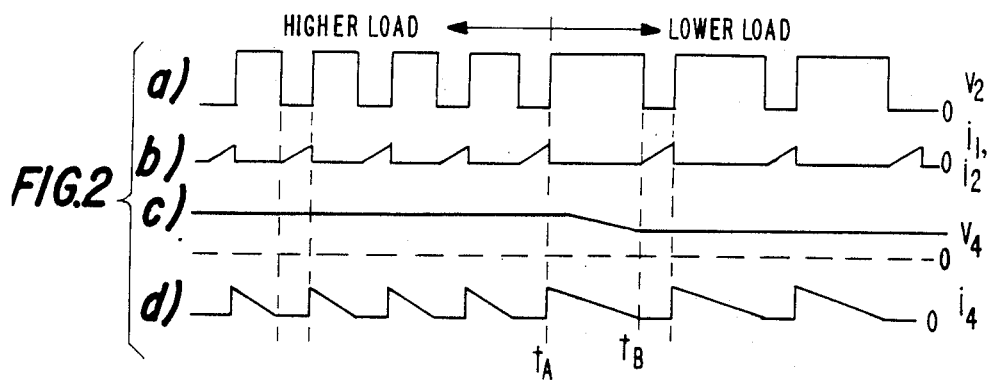
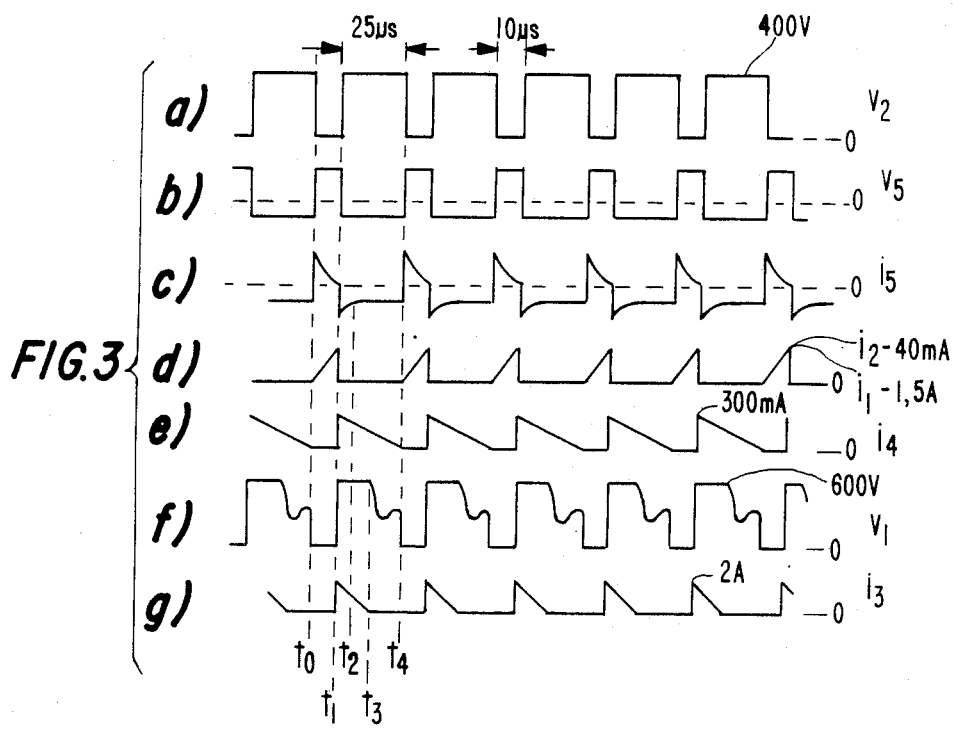

TRANSFORMER DATA

*FIG. 7* MODIFICATION OF THE CIRCUIT OF FIGURE 1 FOR HIGH AUDIO POWER CONSUMPTION

FIG. 8

| ROW # | MAINS VOLTAGE [V] | BEAM CURRENT [mA] | B+ VOLTAGE [V] | ΔV [mV] | CIRCUIT TYPE |
|---|---|---|---|---|---|
| 1 | 220 | 0.8 | 139.8 | 700 | PRIOR ART |
|   |     | 0   | 140.5 |     |           |
| 2 | 220 | 0.8 | 140.5 | 200 | SMPS OF FIG. 1 |
|   |     | 0   | 140.7 |     |           |

FIG. 9

| ROW # | MAINS VOLTAGE [V] $V_{AC}$ | BEAM CURRENT [mA] | B+ VOLTAGE [V] | ΔV [mV] | CIRCUIT TYPE |
|---|---|---|---|---|---|
| 1 | 180 | 0.5 | 139.1 | 1.4 | PRIOR ART |
|   | 250 |     | 140.5 |     |           |
| 2 | 180 | 0.5 | 140.4 | 0.1 | SMPS OF FIG. 1 |
|   | 250 |     | 140.5 |     |           |

SWITCH-MODE POWER SUPPLY WITH BURST MODE STANDBY OPERATION

The invention relates to switch-mode power supplies.

In a typical switch mode power supply (SMPS) of a television receiver the AC mains supply voltage is coupled to a bridge rectifier. An unregulated direct current (DC) input supply voltage is produced. A pulse width modulator controls the duty cycle of a chopper transistor switch that applies the unregulated supply voltage across a primary winding of a flyback transformer. A flyback voltage at a frequency that is determined by the modulator is developed at a secondary winding of the transformer and is rectified to produce DC output supply voltages such as a voltage B+ that energizes a horizontal deflection circuit of the television receiver and a voltage that energizes a remote control unit.

During normal operation, the DC output supply voltages are regulated by the pulse width modulator in a negative feedback manner. During standby operation, the SMPS is required to generate the DC output supply voltage that energizes the remote control unit. However, most other stages of the television receiver are inoperative and do not draw supply currents. Consequently, the average value of the duty cycle of the chopper transistor may have to be substantially lower during standby than during normal operation.

Because of, for example, storage time limitation in the chopper transistor, it may not be possible to reduce the length of the conduction interval in a given cycle below a minimum level. Thus, in order to maintain the average value of the duty cycle low, it may be desirable to operate the chopper transistor in an intermittent or burst mode, during standby. During standby, a long dead time interval occurs between consecutively occurring burst mode operation intervals. Only during the burst mode operation interval switching operation occurs in the chopper transistor. The result is that each of the conduction intervals is of a sufficient length.

In accordance with an aspect of the invention, burst mode operation intervals are initiated and occur at a rate that is determined by a repetitive signal at the frequency of the AC mains supply voltage. For example, when the mains supply voltage is at 50 Hz, each burst mode operation interval, when switching cycles occur, may last 5 milliseconds and the dead time interval when no switching cycles occur, may last during the remainder portion or 15 milliseconds. Such arrangement that is triggered by a signal at the frequency of the mains supply voltage simplifies the design of the SMPS.

The burst mode operation intervals that occur in standby operation are synchronized to the 50 Hz signal. During each such interval, pulses of current are produced in transformers and inductances of the SMPS. The pulses of current occur in clusters that are repetitive at 50 Hz. The pulses of current occur at a frequency that is equal to the switching frequency of the chopper transistor within each burst mode operation interval. Such current pulses might produce an objectionable sound during power-off or standby operation. The objectionable sound might be produced due to possible parasitic mechanical vibrations as a result of the pulse currents in, for example, the inductances and transformers of the SMPS.

In accordance with another aspect of the invention, the change in the AC mains supply voltage during each period causes the length of the conduction interval in consecutively occurring switching cycle during the burst mode operation interval to increase progressively. Such operation that occurs during each burst mode operation interval may be referred to as soft start operation. The soft start operation causes, for example, gradual charging of capacitors in the SMPS. Consequently, the parasitic mechanical vibrations are substantially reduced. Also, the frequency of the switching cycles within each burst mode operation interval is maintained above the audible range for further reducing the level of such audible noise during standby operation.

A switch mode power supply, embodying an aspect of the invention, for generating an output supply voltage during both a standby-mode of operation and during a run-mode of operation includes a source of AC mains input supply voltage. A control signal at a given frequency is generated. A switching arrangement energized by the input supply voltage and responsive to the first control signal produces a switching current during both the standby-mode of operation and the run-mode operation. The output supply voltage is generated from the switching current. An arrangement coupled to the switching arrangement and responsive to a standby-mode/run-mode control signal and to a signal at a frequency that is determined by a frequency of the AC mains input supply voltage controls the switching arrangement in a burst mode manner during the standby-mode of operation. During a burst interval, a plurality of switching cycles are performed and during an alternating dead time interval no switching cycles are performed. The two intervals alternate at a frequency that is determined by the frequency of the AC mains input supply voltage.

FIGS. 2a–2d illustrate waveforms useful for explaining the run mode operation of the circuit of FIG. 1 when loading varies;

FIGS. 3a–3g illustrate additional waveforms useful for explaining the run mode operation of the circuit of FIG. 1 under a constant loading condition;

Figure 1:
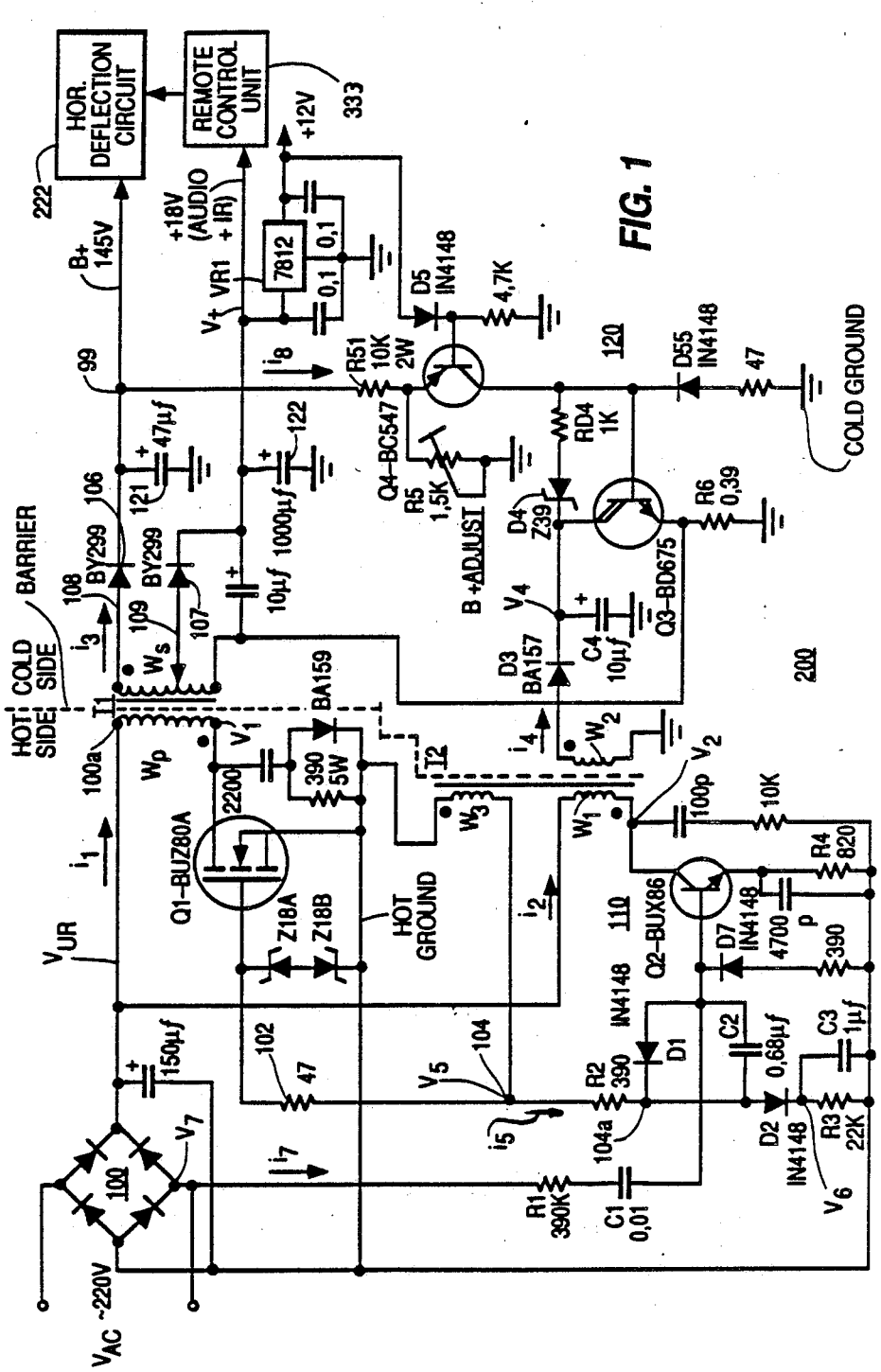
FIG. 1 illustrates a power supply embodying an aspect of the invention.

FIG. 8 provides performance data in a table form of the circuit of FIG. 1 and also, for comparison purposes, of a conventional power supply; and FIG. 9 provides additional performance data in a table form of the circuit of FIG. 1 and also, for comparison purposes, of a conventional power supply.

FIG. 1 illustrates a switch-mode power supply (SMPS) 200, embodying an aspect of the invention. SMPS 200 produces an output supply voltage B+ at +145 volts that is used for energizing, for example, a deflection circuit of a television receiver, not shown, and an output supply voltage V+ at +18 volts that are both regulated. A mains supply voltage $V_{AC}$ is rectified in a bridge rectifier 100 to produce an unregulated voltage $V_{UR}$. A primary winding $W_p$ of a flyback isolation transformer T1 is coupled between a terminal 100a, where voltage $V_{UR}$ is developed, and a drain electrode of a power chopper MOS transistor Q1.

The source electrode of MOS transistor Q1 of FIG. 1 is coupled to a common conductor, referred to herein as "hot" ground. The gate electrode of transistor Q1 is coupled via a coupling resistor 102 to a terminal 104 where a pulse-width modulated signal $V_5$ is produced. Signal $V_5$ produces a switching operation in transistor Q1. A secondary winding $W_3$ of an isolation transformer T2, across which signals $V_5$ is developed, is coupled between terminal 104 and the hot ground conductor. A pair of back-to-back zener diodes Z18A and Z18B provide gate protection in transistor Q1. Winding $W_3$, winding $W_p$, transistor Q1 and signal $V_5$ are at potentials that are referenced to the hot ground conductor.

Figure 4:
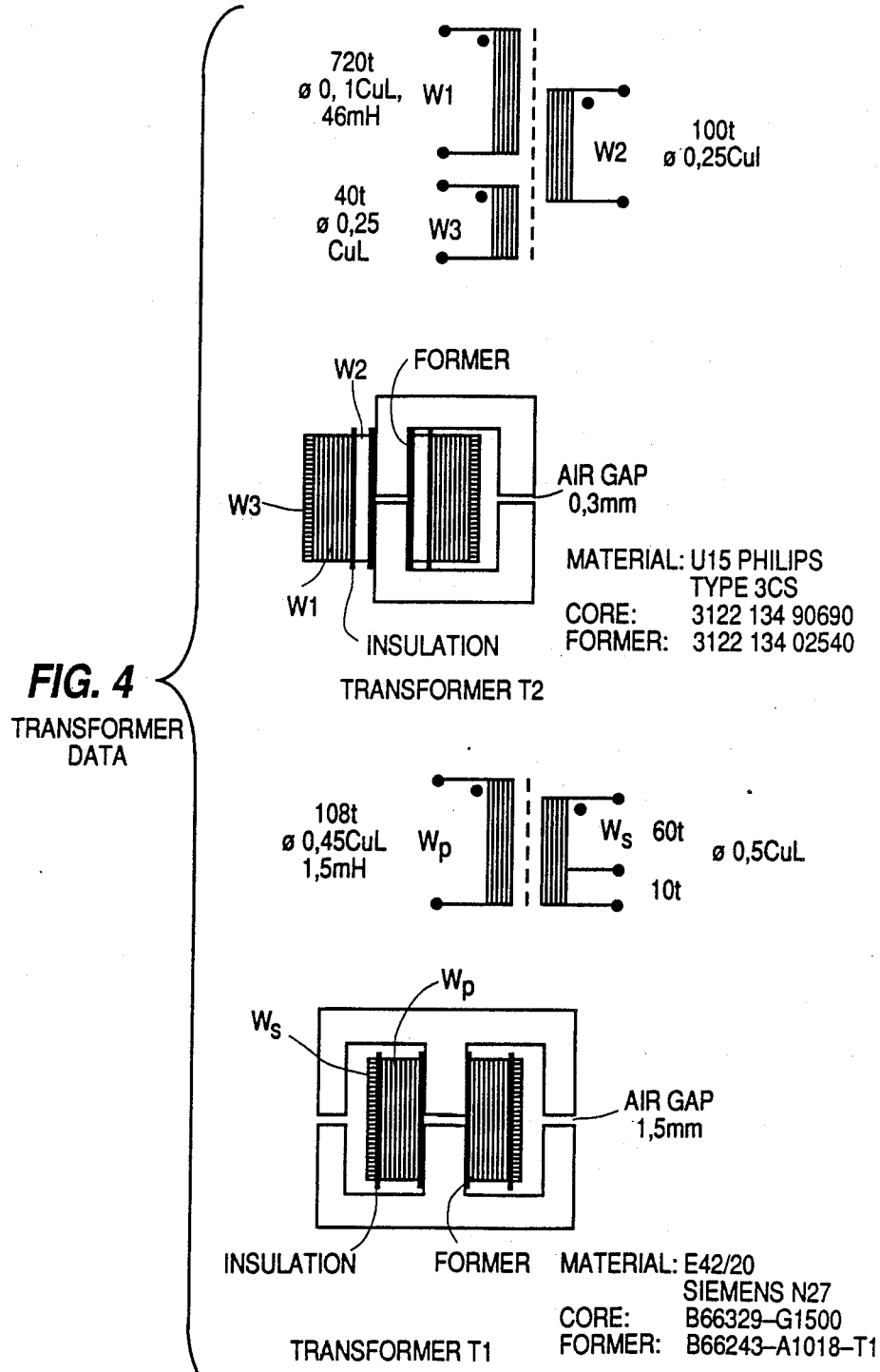
FIG. 4 illustrates the way the isolation transformers that are used in the circuit of FIG. 1 are constructed.

Transformers T1 and T2 are constructed in a manner shown in FIG. 4. Similar symbols and numerals in FIGS. 1 and 4 indicate similar items or functions.

FIGS. 3a–3g illustrate waveforms useful for explaining the normal steady state operation or run mode of the SMPS of FIG. 1 under a constant loading condition. Similar symbols and numerals in FIGS. 1 and 3a–3g indicate similar items or functions.

During, for example, interval $t_0$–$t_1$ of FIG. 3b of a corresponding given cycle or period, the voltage of pulse signal $V_5$ is positive relative to the hot ground conductor for maintaining transistor Q1 of FIG. 1 conductive during interval $t_0$–$t_1$ of FIG. 3b. Consequently, a current $i_1$ in winding $W_P$ of FIG. 1 is upramping, as shown in FIG. 3d, during interval $t_0$–$t_1$. Therefore, an inductive energy is stored in transformer T1 of FIG. 1. At time $t_1$ of FIG. 3d, transistor Q1 of FIG. 1 becomes nonconductive.

After transistor Q1 becomes nonconductive, the inductive energy stored in winding $W_p$ is transferred by a flyback transformer action to a secondary winding $W_S$ of transformer T1. Flyback pulses developed in corresponding terminals 108 and 109 of winding $W_S$ are rectified by diodes 106 and 107, respectively, and filtered in capacitors 121 and 122, respectively, for producing DC voltages B+ and V+, respectively, that are all referenced to a second common conductor, referred to herein as "cold" ground. The cold ground is conductively isolated from the hot ground conductor with respect to an electrical shock hazard by transformers T1 and T2. Transistor Q1, transformer T1 and diodes 106 and 107 form an output stage of the SMPS.

A pulse-width modulator of SMPS 200 includes a blocking oscillator 110, embodying an aspect of the invention, that produces switching signal $V_5$ for controlling the switching operation of transistor Q1. Oscillator 110 includes a switching transistor Q2 having a base electrode that is also controlled or switched by signal $V_5$. Winding $W_3$ of transformer T2 provides positive feedback in oscillator 110 by developing signal $V_5$. Transformer T2 has a primary winding $W_1$ that is coupled between voltage $V_{UR}$ and the collector of transistor Q2 such that winding $W_1$ is referenced to the hot ground conductor. A secondary winding $W_2$ of transformer T2 that is referenced to the cold ground conductor is conductively coupled to a diode D3 of a control circuit 120, embodying another aspect of the invention, that is also referenced to the cold ground conductor.

The cathode of diode D3 is coupled to the cold ground conductor via a capacitor C4. As explained later on, a DC control voltage $V_4$ developed across capacitor C4 varies the nonconduction time or duty cycle of transistor Q2 during each period.

A capacitor C2 is coupled between the base electrode of transistor Q2 and a terminal 104a. A resistor R2 is coupled between terminal 104a and terminal 104 where signal $V_5$ is developed. During interval $t_0$–$t_1$ of FIG. 3b, a current $i_5$ of FIG. 3c is produced in resistor R2 of FIG. 1 that is coupled between terminals 104 and 104a. Current $i_5$ of FIG. 3c that is produced by signal $V_5$ of FIG. 3b charges capacitor C2 of FIG. 1 in a manner that turns on transistor Q2, during interv $t_0$–$t_1$ of FIG. 3d.

During normal operation, when transistor Q2 of FIG. 1 is conductive, a current $i_2$ of FIG. 3d in winding $W_1$ of FIG. 1 increases linearly, until an emitter voltage of transistor Q2 that is developed across an emitter resistor R4 is sufficiently high to initiate a rapid turn-off operation in transistor Q2. Feedback resistor R4 is coupled between the emitter of transistor Q2 and the hot ground conductor. Resistor R4 causes a gradual decrease of current $i_5$ of FIG. 3c when transistor Q2 of FIG. 1 is conductive until transistor Q2 ceases to conduct at time $t_1$ of FIG. 3c. Resistor R4 of FIG. 1 also serves to optimize the switching condition and to provide current protection in transistor Q2. The result is that the voltage across winding $W_1$ reverses polarity. The turn-off operation is rapid because of the positive feedback caused by winding $W_3$ in developing signal $V_5$.

As indicated before, winding $W_3$ provides pulse drive signal $V_5$ that controls also transistor Q1. The conduction interval in each cycle of transistors Q1 and Q2 remains substantially constant or unaffected by loading. Therefore, advantageously, the stored energy in transformer T1, when transistor Q1 becomes nonconductive, is substantially constant for a given level of voltage $V_{UR}$. However, the conduction interval may vary when a variation in voltage $V_{UR}$ occurs.

When transistor Q2 ceases to conduct, a downramping current $i_4$ of FIG. 3e is produced in winding $W_2$ of transformer T2 of FIG. 1. Current $i_4$ causes diode D3 of FIG. 1 to be conductive and charges capacitor C4, during interval $t_1$–$t_4$ of FIG. 3e. For a given level of voltage $V_{UR}$ of FIG. 1, and for a given duty cycle of transistor Q2, the charge added to capacitor C4 is the same in each cycle. During interval $t_1$–$t_4$, control voltage $V_4$ of FIG. 1, except for the forward voltage drop in diode D3, is substantially developed across winding $W_2$.

Voltage $V_4$ determines the length of interval $t_1$–$t_4$ of FIG. 3e that is required to deplete the magnetic energy stored in transformer T2 of FIG. 1. When, at time $t_4$ of FIG. 3e, current $i_4$ becomes zero, the polarity of signal $V_5$ of FIG. 3b changes as a result of resonance oscillations in the windings of transformer T2. Therefore, positive current $i_5$ of FIG. 3c is generated. As explained before, when current $i_5$ is positive, it causes transistors Q1 and Q2 to be conductive.

During the aforementioned nonconduction interval $t_1$–$t_4$ of FIG. 3b of transistors Q1 and Q2 of FIG. 1, signal $V_5$ is negative, as shown during interval $t_1$–$t_4$ of FIG. 3b. Consequently, a current in the opposite polarity, as shown in FIGS. 3c, flows through capacitor C2 of FIG. 1, during interval $t_1$–$t_2$ of FIG. 3c, and through diode D1 of FIG. 1 during interval $t_2$–$t_4$ of FIG. 3c. The resulting charge in capacitor C2 of FIG. 1 produces a voltage in capacitor C2 is in such a polarity that tends to turn on transistor Q2 rapidly, when, at time $t_4$ of FIGS. 3b, signal $V_5$ reverses polarity.

Control circuit 120 of FIG. 1 that is referenced to the cold ground conductor controls the duty cycle of oscillator 110 by varying control voltage $V_4$ across capacitor C4. A transistor Q4 of circuit 120 is coupled in a common base amplifier configuration. The base voltage of transistor Q4 is obtained via a temperature compensating forward biased diode D5 from a +12 V voltage regulator VR1. Regulator VR1 is energized by voltage V+.

A fixed resistor R51 is coupled between the emitter of transistor Q4 and voltage B+. As a result of the common base operation, a current $i_8$ in resistor R51 is proportional to voltage B+. An adjustable resistor R5 that is used for adjusting the level of voltage B+ is coupled between the cold ground conductor and a junction terminal between the emitter of transistor Q4 and resistor R51. Resistor R51 is used for adjusting the level of the current in transistor Q4. Thus, an adjustable preset portion of current $i_8$ flows to the cold ground conductor through resistor R5 and an error component of current $i_8$ flows through the emitter of transistor Q4.

The collector current of transistor Q4 is coupled to the base of a transistor Q3 for controlling a collector current of transistor Q3. The collector of transistor Q3 forming a high output impedance is coupled to the junction between capacitor C4 and diode D3. When transistor Q2 becomes nonconductive the stored energy in transformer T2 causes current $i_4$ to flow via diode D3 into capacitor C4, as indicated before. Regulation of the power supply is obtained by controlling control voltage $V_4$. Voltage $V_4$ is controlled by controlling the loading across winding $W_2$ of transformer T2 by means of transistor Q3.

The collector current of transistor Q3 that forms a current source having a high output impedance is coupled to capacitor C4 that operates as a flywheel. In steady state, the amount of charge that is added to capacitor C4 during interval $t_1$-$t_4$ of FIG. 3e is equal to the amount of charge that is removed by transistor Q3 from capacitor C4 in a given period $t_0$-$t_4$.

FIGS. 2a-2d illustrate waveforms useful for explaining the regulations operation of the SMPS of FIG. 1 under different loading conditions. Similar symbols and numerals in FIGS. 1, 2a-2d and 3a-3g indicate similar items or functions.

After, for example, time $t_4$ of FIGS. 2a-2d, the power supply current loading across capacitor 121 of FIG. 1 decreases and voltage B+ tends to increase. As a result of the increase in voltage B+, transistor Q3 conducts a higher level of collector current. Therefore, voltage $V_4$ of FIG. 2c across capacitor C4 of FIG. 1 becomes smaller. Therefore, a longer time is required in each period for removing the stored inductive energy from transformer T2 of blocking oscillator 110, after transistor Q2 becomes nonconductive. It follows that the length of the interval, $t_4$-$t_B$, of FIG. 2a, in a given cycle, when transistor Q2 of oscillator 110 of FIG. 1 is nonconductive, increases under reduced loading condition. The result is that the duty cycle, that is the ratio between the "on" time to the "off" time of transistor Q1 decreases, as required for proper regulation.

In steady state, voltage $V_4$ is stabilized at a level that causes an equilibrium between the charging and discharging currents of capacitor C4. The increase in voltage B+ is capable of causing, advantageously, a proportionally greater change in voltage $V_4$, as a result of amplification and current integration of the collector current of transistor Q3 in capacitor C4. In a transient condition, as long as voltage B+ is, for example, greater than +145 volts, voltage $V_4$ will decrease.

The result is that voltage $V_4$ of FIG. 1 tends to change in a manner that tends to nullify the aforementioned tendency of voltage B+ to increase under reduced loading. Thus, regulation is obtained in a negative feedback manner. In the extreme case, a short circuit across winding $W_2$ could inhibit oscillation in oscillator 110 thus providing, advantageously, an inherent fail safe feature, as described later on.

Conversely, a tendency of voltage B+ to decrease will increase the duty cycle of transistors Q1 and Q2 in a manner that provides regulation. Thus, the nonconduction interval of transistor Q1 varies with current loading at a terminal 99 where voltage B+ is developed.

Processing voltage B+ for producing control voltage $V_4$ is accomplished, advantageously, in a DC coupled signal path for improving error sensing. Also, a change in voltage B+ is capable of causing a proportionally greater change in voltage $V_4$ thus improving error sensitivity. Only after the error in voltage B+ is amplified, the amplified error contained in DC coupled voltage $V_4$ is transformer or AC coupled to effectuate pulse-width modulation. The combination of such features improves the regulation of voltage B+.

Another way by which an arrangement similar to control circuit 120 is used for regulation purposes is shown and explained in a copending U.S. patent application, RCA Docket No. 85,439 entitled, A SYNCHRONIZED SWITCH-MODE POWER SUPPLY, in the name of Leonardi, filed concurrently herewith and incorporated by reference herein. There, a voltage that is produced similarly to voltage $V_4$ of FIG. 1 is transformer coupled to a sawtooth generator. The transformer coupled voltage varies a sawtooth signal that is used for producing a pulse-width modulated control signal.

A zener diode D4 is coupled in series with a resistor $R_{D4}$, between the base and collector electrodes of transistor Q3. Zener diode D4, advantageously, limits voltage $V_4$ to about 39 volts. Zener diode D4 limits the frequency of oscillator 110, or the minimum cut-off time of transistors Q2 and Q1. In this way, the maximum power transferred to the load is, advantageously, limited for providing over-current protection.

For safe operation, it may be desirable to have secondary current $i_3$ in winding $W_s$ decay to zero before transistor Q1 is turned on again. This means that the decay time of current $i_3$ should be, preferably, shorter than that of current $i_4$ of blocking oscillator 110. This condition can be met by a proper choice of the primary inductance of transformer T2 and of zener diode D4.

Standby operation is initiated by operating SMPS 200 in a low power operation mode. The low power operation mode occurs when the power demand from the SMPS drops below 20–30 watts. For example, within horizontal deflection circuit 222 a horizontal oscillator, not shown, that is controlled by a remote control unit 333 ceases operating during standby. Therefore, a horizontal deflection output stage in deflection circuit 222, that is energized by voltage B+, ceases operation as well. Consequently, the loading at terminal 99, where voltage B+ is produced, is reduced. It follows that voltage B+ and the error current in transistor Q4 tend to increase. Therefore, transistor Q3 saturates, causing a near short circuit across winding $W_2$ of transformer T2 that causes voltage $V_4$ to be approximately zero throughout the standby mode of operation. Consequently, unlike in the run-mode of operation, a positive pulse of signal $V_5$ cannot be generated by resonance oscillations in transformer T2. It follows that the regenerative feedback loop is prevented from initiating the turn on transistor Q2. Consequently, continuous oscillation cannot be sustained.

In accordance with an aspect of the invention, transistor Q2 is periodically triggered into switching in a burst mode operation by an upramping portion of a half wave rectified voltage of a signal $V_7$. Signal $V_7$ occurs at the mains frequency, such as 50 Hz. Signal $V_7$ is derived from bridge rectifier 100 and is applied to the base of transistor Q2 via a series arrangement of a resistor R1 and a capacitor C1. The series arrangement operates as a differentiator that produces a current $i_7$.

FIGS. 5a-5d illustrate waveform during standby operation, indicating that burst mode switching operation of oscillator 110 occurs during an interval $t_{10}$-$t_{12}$ followed by a dead time interval $t_{12}$-$t_{13}$, when no trigger pulses of signal $V_5$ are present in the blocking oscillator. Similar symbols and numerals in FIGS. 1 and 5a-5d indicate similar items or functions.

A parallel arrangement of a capacitor C3 of FIG. 1 and a resistor R3 is coupled in series with a diode D2 to form an arrangement that is coupled between the hot ground conductor and junction terminal 104a, between capacitor C2 and resistor R2. A diode D1 is coupled in parallel with capacitor C2.

During normal run mode operation, capacitor C3 remains charged to a constant voltage $V_6$ by the positive voltage pulses of signal $V_5$ that is developed in winding W3 each time transistor Q2 is conductive. Therefore, capacitor C3 is decoupled from the positive feedback signal path and has no effect on circuit operation. During standby operation, capacitor C3 discharges during the long inactive periods or dead time, as shown by voltage $V_6$ between times $t_{12}$-$t_{13}$ in FIG. 5b.

Figure 5:
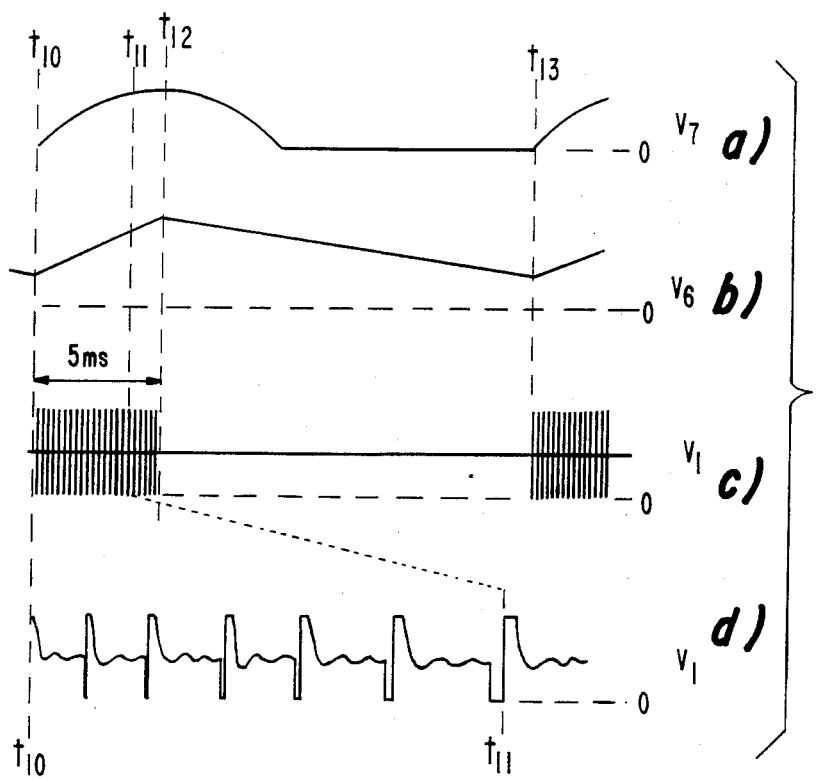
FIGS. 5a–5d illustrate waveforms useful for explaining a standby operation of the power supply of FIG. 1.

Immediately after time $t_{10}$ of FIG. 5a of a given interval $t_{10}$-$t_{13}$, current $i_7$ of FIG. 1, produced by voltage differentiation in capacitor C1, increases from zero to a maximum positive value. As a result, a base current, produced in transistor Q2, causes transistor Q2 to be conductive. When transistor Q2 becomes conductive, a positive pulse of signal $V_5$ is produced in winding W3 that maintains transistors Q1 and Q2 conductive.

Similarly to normal run mode operation that was described before, transistor Q2 remains conductive until the magnitude of the base current of transistor Q2 is insufficient to maintain transistor Q2 in saturation, as collector current $i_2$ is upramping. Then, collector voltage $V_2$ increases and signal $V_5$ decreases. The result is that by means of positive feedback transistor Q2 is turned-off.

The voltage across capacitor C2 produces negative current $i_5$ that discharges capacitor C2 via a diode D7 and that maintains transistor Q2 in cut-off. As long as a magnitude of negative current $i_5$ is larger than that of positive current $i_7$, the base current in transistor Q2 is zero and transistor Q2 remains nonconductive. When the magnitude of negative current $i_5$ of FIG. 1 becomes smaller than current $i_7$, transistor Q2 is turned on again and positive current $i_5$ is generated.

During a substantial portion of a given conduction interval of transistor Q2, current $i_5$ flows entirely via capacitor C2 to form the base current of transistor Q2. Because collector current $i_2$ is upramping, the emitter voltage of transistor Q2 increases in an upramping manner, causing the voltage at the anode of diode D2 to increase. When the voltage at the anode of diode D2 becomes sufficiently positive, diode D2 begins conducting. Therefore, a substantial portion of current $i_5$ is diverted by capacitor C3 from the base of transistor Q2. The result is that the base current becomes insufficient to sustain the collector current of transistor Q2. Therefore, the positive feedback signal path causes transistor Q2 to turn-off. Thus, the peak amplitude of current $i_2$ is determined by the level of voltage $V_6$ across capacitor C3.

During interval $t_{10}$-$t_{12}$ of FIGS. 5a-5d, capacitor C3 of FIG. 1 is coupled via diode D2 to the positive feedback signal path and charged by positive current $i_5$. Therefore, voltage $V_6$ of FIG. 5b becomes progressively larger.

In accordance with a further aspect of the invention, voltage $V_6$ that becomes progressively larger causes the conduction interval during each cycle that occurs in interval $t_{10}$-$t_{12}$ of FIGS. 5a-5d to become progressively longer. Consequently, the peak amplitudes and the pulse widths of currents $i_1$ and $i_2$ of FIG. 1 increase progressively.

During a corresponding nonconduction portion of each cycle that occurs in interval $t_{10}$-$t_{12}$ of FIGS. 5a-5d, capacitor C2 of FIG. 1 is discharged via a diode D7 and resistor R2. The length of the nonconduction interval of transistor Q2 in each cycle is determined by the time required for discharging capacitor C2 to such a level that causes a magnitude of negative current $i_5$ to be smaller than that of positive current $i_7$.

In accordance with a feature of the invention, that nonconduction interval becomes progressively longer because capacitor C2 is charged to a progressively higher voltage and also because the magnitude of current $i_7$ becomes progressively smaller. Therefore, positive base current will begin flowing in the base of transistor Q2 after progressively longer nonconduction intervals. The result is that the switching frequency during the burst mode interval will vary or decrease progressively.

At time $t_{12}$ of FIG. 5a current $i_7$ is zero. Therefore, burst mode operation that occurred during interval $t_{10}$-$t_{12}$ cannot continue and the long dead time interval $t_{12}$-$t_{13}$ occurs in which no switching operation happens. At time $t_{13}$, positive current $i_7$ is generated again and a subsequent burst mode switching interval occurs in transistors Q1 and Q2.

During the burst mode interval $t_{10}$-$t_{12}$ of FIG. 5d, the length of the conduction interval in each cycle increases progressively, as explained before. Such operation may be referred to by the term soft start operation. Because of the soft start operation, capacitors, for example, of SMPS 200 are charged or discharged in a gradual manner.

In accordance with another feature of the invention, volta $V_6$ of capacitor C3 by being lower than during run mode operation maintains the switching frequency of transistors Q1 and Q2 of FIG. 1 above the audible range in SMPS 200 of FIG. 1 throughout interval $t_{10}$-$t_{12}$ of FIG. 5a. As a result of the soft start operation during standby and of the high switching frequency during standby, noise produced by parasitic mechanical vibrations in inductors and transformers of SMPS 200 of FIG. 1 is, advantageously, substantially reduced.

The burst mode operation during interval $t_{10}$-$t_{12}$ of FIG. 5c produces voltage V+ of FIG. 1 at a sufficient level to enable the operation of remote control unit 333 of FIG. 1, during standby. Because of the burst mode operation, the energy consumed in SMPS 200 is maintained substantially lower or about 6 watts than during normal run mode operation.

To generate voltage V+ at the required level for operating remote control unit 333, a corresponding average duty cycle of transistors Q1 and Q2 that is substantially lower than during run mode is required. The length of the conduction interval in transistor Q1, for example, should be longer than the storage time of transistor Q1. Accordingly, by operating in the burst mode, the conduction interval of transistor Q1 in each cycle can be maintained longer for obtaining the required lower average duty cycle than if continuous switching operation had occurred during standby. Such continuous switching operation in transistors Q1 and Q2 occurs during normal run mode operation without the occurrence of dead time intervals such as interval $t_{12}-t_{13}$ FIG. 5d.

Figure 6:
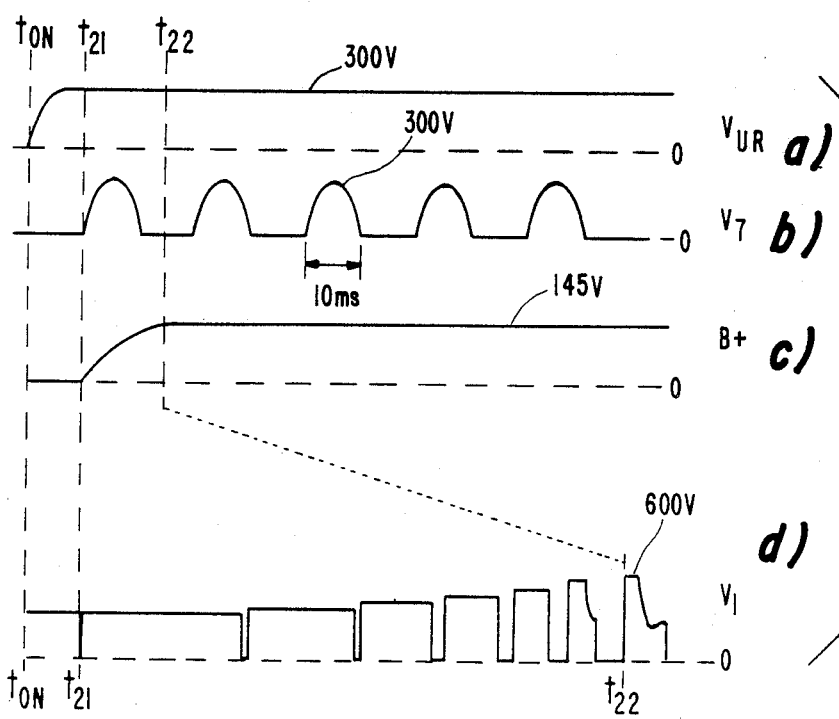
FIGS. 6a–6d illustrate transient waveforms useful for explaining the operation of the circuit of FIG. 1 during start-up.

The SMPS has also a soft start-up feature, as will now be explained with the aid of waveforms in FIGS. 6a-6d. Similar symbols and numerals in FIGS. 1, 5a-5d and 6a-6d indicate similar items or functions. The start-up mode is similar to the stand-by operation. When the power supply is first turned on, capacitors C3 and C4 are discharged and there is no forward bias on the base of transistor Q2. Oscillation is initiated by feeding a small portion of rectified AC supply signal $V_7$ to the base of transistor Q2. As illustrated by FIG. 6d, the oscillator duty cycle is initially very short, or the interval in each cycle when transistor Q2 is nonconductive is long, because winding W2 of transformer T2 is heavily loaded by the discharged capacitor C4. The charge on capacitors C3 and C4, and voltage B+ build up gradually over a period of about 15 msec, as shown in FIG. 6c. Normal operation begins following this slow build up.

In case of a short circuit at output terminal 99 of FIG. 1, for example, SMPS 200 goes into an intermittent mode operation, in a similar manner to the stand-by operation mode. For example, if capacitor C121 of FIG. 1 is short circuited, the increase in current $i_3$ flowing through secondary winding $W_S$ of transformer T1 causes a higher negative bias to develop across a resistor R6 that is coupled to the emitter of transistor Q3. Base current then flows into transistor Q3 through a diode D55, causing transistor Q3 to saturate and to clamp its collector voltage V4 to ground. The consequent loading of transformer T2 causes SMPS 200 to operate in the intermittent burst mode as described for stand-by mode operation.

Figure 7:
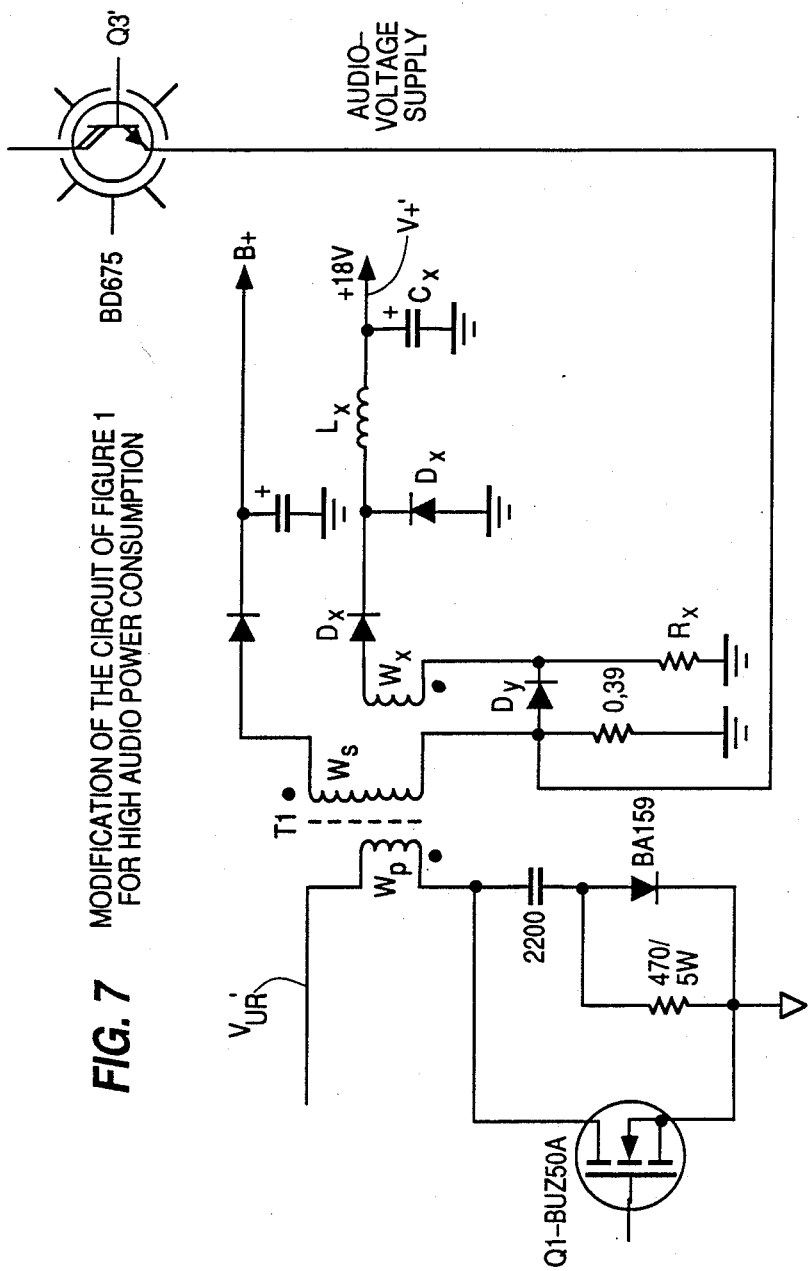
FIG. 7 illustrates the circuit of FIG. 1 that incorporates a modification to increase output power.

The low voltage supply portion of SMPS 200 that produces voltage V+ may be arranged to operate as a forward converter in case of, for example, high audio power requirements. FIG. 7 shows a modification of the circuit of FIG. 1 for obtaining forward converter operation. A resistor Rx and a diode Dy of FIG. 7 serve as an overload protection, as explained later on. Similar symbols and numerals in FIGS. 1 and 7 indicate similar items or functions. Should an overload occur when the modification shown in FIG. 7 is employed to provide the high power audio supply resistor Rx senses the excess current and provides negative bias to the emitter of transistor Q3.

FIG. 8 shows, in a table form, the variation of voltage B+ caused by a corresponding variation in a beam current flowing in an ultor electrode, not shown, of a television receiver. Voltage B+ energizes the deflection circuit output stage, not shown, for producing the ultor voltage and the beam current. FIG. 9 shows, in a table form, a variation of voltage B+ caused by a variation of mains supply voltage $V_{AC}$.

For comparison purposes, row No. 1 in each of the tables of FIGS. 8 and 9 provides data obtained when a conventional prior art SMPS using an integrated circuit TDA4601 control circuit and a power transformer Orega No. V4937700 is utilized. Row No. 2 in each of the tables of FIGS. 8 and 9 provides data obtained when the unmodified SMPS of FIG. 1 is utilized. As can be seen, the performance of SMPS 200 of FIG. 1 is superior.

What is claimed is:

1. A switch mode power supply of a television for generating an output supply voltage during both a standby-mode of operation and during a run-mode of operation, comprising:
   a source of AC mains input supply voltage;
   means for generating a periodic first control signal;
   switching means energized by said input supply voltage and responsive to said first control signal for producing a switching current during both said standby-mode of operation and said run-mode of operation;
   means responsive to said switching current for generating therefrom said output supply voltage;
   a source of a standby-mode/run-mode control signal; and
   fourth means coupled to said switching means and responsive to said standby-mode/run-mode control signal and to a signal at a frequency that is determined by a frequency of said AC mains input supply voltage for controlling said switching means in a burst mode manner during said standby mode of operation, such that during a burst interval a plurality of switching cycles are performed and during an alternating dead time interval no switching cycles are performed, the two intervals alternating at a frequency that is determined by said frequency of said AC mains input supply voltage.

2. A power supply in accordance with claim 1 wherein said switching means continuously produces, in said run mode of operation, pulses of said switching current.

3. A power supply according to claim 1 further comprising, a load circuit coupled to said output supply voltage and responsive to said standby-mode/run-mode control signal to generate a load current therein that varies in accordance with said standby-mode/run-mode control signal and means coupled to said load circuit and responsive to at least one of said output supply voltage and said load current for generating a third control signal that is coupled to said third means for enabling said burst mode operation when a level of said at least one of said output supply voltage and load current is outside a normal operation range.

4. A power supply according to claim 3 wherein said third control signal varies a duty cycle of said switching means during said run mode of operation in accordance with said output supply voltage in a negative feedback manner.

5. A power supply according to claim 1 wherein during said run mode of operation the switching cycles of said switching means occur continuously and uninterrupted by dead time intervals.

6. A power supply according to claim 1 further comprising, modulating means responsive to said output supply voltage and coupled to said switching means for pulse width modulating said switching operation of said switching means during said run mode of operation in a negative feedback loop manner, thereby regulating said output supply voltage during said run mode of operation.

7. A power supply according to claim 6 wherein said switching operation is controlled in an open loop manner with respect to variation of said output supply voltage during said standby mode of operation.

8. A power supply according to claim 6 wherein said modulating means is responsive to said AC mains input supply voltage and coupled to said first control signal generating means for pulse-width modulating said first control signal in accordance with a waveform of said input supply voltage to provide a soft start operation during each period of said input supply voltage that occurs in said standby mode of operation.

9. A power supply according to claim 8 wherein said switching means operates in first and second switching states during a given switching cycle and wherein a length of an interval when said switching means operates in one of said states increases progressively during corresponding periods of said AC mains input supply voltage in accordance with a waveform of said input supply voltage to provide said soft start operation during said standby mode of operation.

10. A power supply according to claim 8 wherein said soft start operation causes a reduction in a parasitic mechanical noise in said power supply during said standby mode of operation.

11. A power supply according to claim 8 further comprising a load coupled to said output to said output supply voltage that generates a load current, wherein said third means is responsive to a magnitude of said load current for controlling said switching operation in said burst mode manner when said magnitude of said load current is excessive.

12. A power supply according to claim 11 wherein said modulating means modulates said first control signal in accordance with said waveform of said input supply voltage to provide said soft start operation when said magnitude of said load current is excessive for providing an over-current protection.

13. A switch mode power supply, comprising:
a source of AC mains input supply voltage at a first frequency;
a transformer having a first winding coupled to said input supply voltage;
first switching means coupled to said first winding for generating a switching current therein, said first switching means and said transformer forming a regenerative positive feedback signal path that forms an oscillator that oscillates continuously during a run-mode of operation;
means coupled to said input supply voltage and responsive to an output signal of said oscillator for generating from said input supply voltage said output supply voltage by a switching operation controlled in accordance with said oscillator output signal;
means responsive to said output supply voltage and coupled to said oscillator for modulating said oscillator output signal during said run mode of operation in a negative feedback manner thereby regulating said output supply voltage;
means responsive to a standby-mode/run-mode control signal and coupled to said oscillator for disabling the continuous oscillations in said oscillator, in a standby mode of operation; and
means responsive to a signal at a frequency that is determined by said first frequency for initiating a burst mode switching operation in said first switching means that is repetitive at a frequency determined by said first frequency when the continuous oscillations are disabled.

14. A power supply according to claim 13 wherein said modulating means comprises a capacitor for generating a control voltage in said capacitor having a level that is indicative of a duty cycle of said switching means, required for regulating said output supply voltage, and wherein said power supply further comprises second switching means that is responsive to said switching current for coupling said capacitor to said second winding to apply said control voltage in said capacitor to said second winding during a flyback interval of a given switching cycle of said first switching means, and means coupled to said capacitor and responsive to said standby-mode/run-mode control signal for controlling said control voltage in a manner that disables said regenerative positive feedback signal path during said standby mode of operation.

15. A power supply according to claim 14 wherein said control voltage generating means forms a DC coupled signal path between a terminal where said output supply voltage is developed and a second winding of said transformer.

16. A switch mode power supply for generating an output supply voltage during both a standby-mode of operation and during a run-mode of operation, comprising;
a source of AC mains input supply voltage;
means for generating a first control signal at a given frequency;
switching means energized by said input supply voltage and responsive to said first control signal for producing a switching current during both said standby-mode of operation and said run-mode of operation;
means responsive to said switching current for generating therefrom said output supply voltage;
a source of a standby-mode/run-mode control signal;
means responsive to said standby-mode/run-mode control signal for controlling said switching means in a burst mode manner during said standby mode of operation, such that during a burst interval a plurality of switching cycles are performed and during an alternating dead time interval no switching cycles are performed; and
means coupled to said switching means for controlling a switching frequency in said switching means during said standby-mode of operation, such that said switching frequency of said switching means varies within said burst interval.

17. A power supply in accordance with claim 16 wherein said switching frequency of said switching means varies in accordance with a waveform of said input supply voltage.

18. A power supply according to claim 16 wherein said switching frequency progressively decreases during said burst mode interval.

19. A power supply according to claim 18 wherein the on-time of said switching means progressively increases during said burst mode interval.

20. A power supply according to claim 16 wherein said frequency control means provides a soft start operation within said burst interval.

21. A switch mode power supply, comprising:
a source of AC mains input supply voltage;
a source of a signal at a first frequency;
a transformer having a first winding coupled to said input supply voltage;
first switching means coupled to said first winding for generating a switching signal in said transformer that is coupled back in a positive feedback manner to said first switching means to form an oscillator that oscillates continuously, during a run-mode of operation;
means coupled to said input supply voltage and responsive to an output signal of said oscillator for generating from said input supply voltage said output supply voltage by a switching operation controlled in accordance with said oscillator output signal;
means responsive to said output supply voltage and coupled to said oscillator for modulating said oscillator output signal during a run mode of operation in a negative feedback manner thereby regulating said output supply voltage;
means responsive to a standby-mode/run-mode control signal and coupled to said oscillator for disabling in a standby mode of operation the continuous oscillations in said oscillator;
means responsive to said signal at said first frequency for initiating a burst mode switching operation in said first switching means that is repetitive at a frequency determined by said first frequency when the continuous oscillations are disabled;
a capacitor; and
second switching means responsive to said standby-mode/run-mode control signal for coupling said capacitor to said positive feedback signal path to maintain a switching frequency of said first switching means above an audible range during said burst mode of operation and for decoupling said capacitor from said positive feedback signal path to prevent said capacitor from affecting the oscillation frequency of said oscillator during said run-mode of operation.

22. A power supply according to claim 21 further comprising, a resistor coupled to said capacitor for discharging said capacitor during dead time intervals when no burst mode switching operation occurs in said standby mode of operation.

23. A power supply according to claim 22 wherein said second switching means comprises a diode that is coupled between a second winding of said transformer and said capacitor.

24. A power supply according to claim 23 wherein a current that charges said capacitor via said diode develops a voltage in said capacitor that is ramping in a first direction during a given burst-mode interval and wherein said resistor causes said capacitor voltage to ramp in an opposite direction during said dead time intervals.

* * * * *